United States Patent
Kuder

[15] 3,689,537
[45] Sept. 5, 1972

[54] 3,3-DIMETHYL-2-NORBORNANE PROPIONIC ACID

[72] Inventor: Robert C. Kuder, Excelsior, Minn.
[73] Assignee: General Mills, Inc.,
[22] Filed: March 13, 1969
[21] Appl. No.: 807,075

Related U.S. Application Data

[63] Continuation-in-part of Ser. No. 570,711, Aug. 8, 1966, abandoned.

[52] U.S. Cl. ................................................260/514 B
[51] Int. Cl................................................C07c 61/12
[58] Field of Search.......................260/546, 514, 468

[56] References Cited

FOREIGN PATENTS OR APPLICATIONS 960,894  6/1964  Great Britain.............260/546

OTHER PUBLICATIONS

Allen et al., J. Chem. Soc. 1965, 1918.

*Primary Examiner*—Lorraine A. Weinberger
*Assistant Examiner*—Robert Gerstl
*Attorney*—Anthony A. Juettner, William C. Babcock and Jerome J. Jenko

[57] ABSTRACT

A process of preparing certain alpha substituted carboxylic acid anhydrides by reaction of a compound having ethylenic unsaturation (preferably at a terminal position) and an anhydride of a $C_2$-$C_{18}$ carboxylic acid having an available alpha hydrogen such reaction being carried out in the presence of hydrogen peroxide as the free radical iniator. The products produced by the process are easily esterified to produce esters suitable as perfume additives or flavor additives.

1 Claim, No Drawings

3,3-DIMETHYL-2-NORBORNANE PROPIONIC ACID

This application is a continuation-in-part of my copending application, U. S. Ser. No. 570,711, filed Aug. 8, 1966, now abandoned.

The instant invention relates to the preparation of certain alpha-substituted carboxylic acid compounds, and more particularly, to a process of combining certain carboxylic acid anhydride reactants with certain ethylenically unsaturated reactants to effect alpha-substitution in such anhydride reactants.

The unsaturated reactant used in the practice of the invention contains an ethylenically unsaturated group through which one might expect to obtain olefinic addition polymerization in the presence of a typical polymerization catalyst, i.e., hydrogen peroxide, which is a unique catalyst for use herein. Also, the carboxylic acid reactant used herein is an organic acid anhydride which one might expect to function as a polymerization accelerator in combination with such hydrogen peroxide catalyst and/or as a co-reactant therewith, e.g., to form a corresponding organic peroxide or hydroperoxide.

In contrast, the ethylenically unsaturated reactant ($x$) and the organic carboxylic acid reactant ($a$) hereof, in the presence of such a polymerization catalyst ($b$), hydrogen peroxide, are believed in the practice of the invention to undergo primarily a reaction according to the following oversimplified Equation (A):

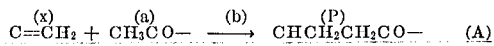

wherein it will be seen that anhydride reactant ($a$) is represented by an acyl group and so is the acid anhydride product (P). Reaction product (P) is substantially a 1:1 adduct of the specific unsaturated reactant ($x$) and the carboxylic acid anhydride ($a$), based on the acyl or acetyl equivalent thereof, vis-a-vis the unsaturation at the methylene group: $=CH_2$ in ($x$).

A conventional textbook type of olefin-carboxylic acid reaction to form an ester is described in Groggins, UNIT PROCESSES IN ORGANIC SYNTHESIS, Fourth Edition, 1952, McGraw-Hill (pages 627 and 639) wherein Groggins refers to Equation (B) below as representative of the reaction:

$$CH_2 = CH_2 + CH_3COOH \rightarrow CH_3COOCH_2CH_3 \quad (B)$$

Apparently the catalyst "sulfuric acid commonly used to effect the union" according to Groggins (p. 627) leaves something to be desired, and he suggests that it is desirable "to get away from the polymerizing effects of sulfuric acid." Groggins further points out that the reaction of Equation (B) "does not go well with ethylene but does with many higher alkenes, particularly with some terpenes" (page 627); and later (page 639) Groggins explains in greater detail how mild esterification conditions with terpenes, according to his Equation (B), are to be employed to minimize undesirable polymerization and/or isomerization. It will be seen that certain terpenes happen to be capable of advantageous use in the present invention; but for use according to previous Equation (A), and not in the esterification process (B) of Groggins. Moreover, it will be found herein that typical polymerization catalysts (i.e., peroxy catalysts) are very effective in catalyzing reaction (A) even though polymerization of the olefinic reactant ($x$) is substantially avoided in the practice of the invention.

Prior to and since Groggins, a number of workers have laid claim to a variety of discoveries relative to the use of ethylene in reactions generalized by Equation (C) below:

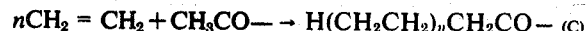

wherein allegedly significant and different values are given for $n$ ranging from 1 to very high numbers. Each such worker has urged some particular set of reaction conditions, reactants and/or factors allegedly unique for his purpose (e.g., Hanford et al., U. S. Pat. No. 2,402,137 in 1946; Roland et al., U. S. Pat. No. 2,433,015 in 1947; and Banes U. S. Pat. No. 2,585,723). Banes alone recites $H_2O_2$, but shows only the use of organic peroxy catalysts and only acid not anhydride reactants.

Some more recent workers have mentioned the use of higher alkenes than ethylene, e.g., Moote U. S. Pat. No. 2,823,216 in 1958, who explains that in his reaction using $C_5$ to $C_{18}$ alkenes he must use at least a $C_3$ carboxylic acid because acetic is not satisfactory for his reaction. This latter difficulty is apparently overcome by Hey et al., in Belgian Patent No. 621,365, French Pat. No. 1,330,454 and British Pat. No. 960,894 (1964) who claim to use acetic acid, acetic anhydride, ethyl acetate and a variety of other $CH_3CO-$ compounds for reaction with alkenes, specifically showing octene-1, butene-1, decene-1 and heptene-1, in the presence of various catalysts including organic peroxides in the examples.

The foregoing Hey et al. disclosures are not completely identical or consistent, except perhaps in the specific descriptions of the examples therein. Thus, in the Hey et al. French and Belgian patents, the olefins are described in general terms including $X_2C = CX_2$ wherein each X may be alkyl, hydrogen, etc., whereas the British patent would appear to be expressly limited to $X_2C = CH_2$ type olefins. On the other hand, only the British patent mentions cyclohexene (page 1, line 50) even though no example for the use thereof is shown, and this particular olefinic type is otherwise clearly excluded from the scope of the British patent disclosure and claims.

In a late 1965 publication by Hey (as co-author with Allen and Cadogen, J. Chem. Soc. 1965, 1918–32) reference is made to various theoretical considerations involved relative to specific reactions comparable to those shown in the aforesaid British patent; but again without describing a specific experiment by the authors using cyclohexene. Instead, on pages 1928–9, the authors confess to an apparent anomaly in a report of Nagai et al. (J. Chem. Soc. Japan) indicating that "the benzoyl peroxide addition of chloracetic acid to cyclohexene involves abstraction of chlorine"; but the observation of the Hey et al. group is made relative to their own work with the ester, ethyl chloroacetate, and without representation as to work actually done by them in connection with any cycloolefin (including cyclohexene).

In such 1965 publication (pages 1928–29), thus, Hey et al. observe that the following Equation (D) is allegedly known:

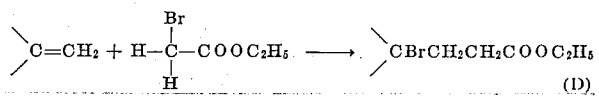

(D)

which reaction (D) involves an alpha-Br ester starting material; but they indicate that in the case of octene-1 and the corresponding chloroester they believe the main reaction is that of Equation (E):

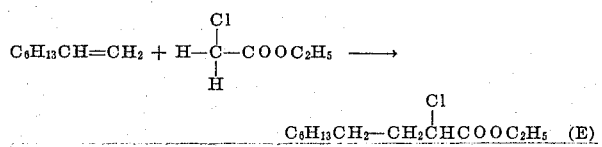

They then note that Nagai et al have alleged that the "-benzoyl peroxide-initiated addition of chloroacetic acid to cyclohexene involves abstraction of chlorine" presumably according to Equation (F):

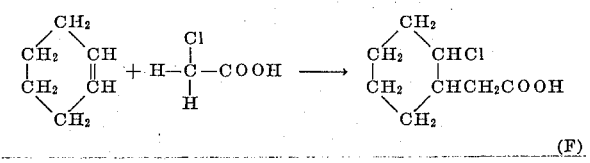

wherein the ethylenic unsaturation between the intracyclic C's is presumably satisfied in part by the alpha-Cl. Hey et al. do not describe a different experimental result; but do point out that prior art suggestions and their own work relative to cyclohexanone-olefin and cyclohexylacetate-olefin additions appear to reveal certain peculiarities of intracyclic groups in these cycloaliphatic ketones and/or esters when used as reactants with olefins. Hey et al do not, however, describe any work of their own relative to the use of cycloaliphatic olefins with carboxylic acid reactants ( or the use of $H_2O_2$).

In contrast, it is a primary object of the instant invention to provide a novel process for preparing certain alpha-substituted carboxylic acid anhydrides, according to previous Equation (A), by reaction of ( $x$) a compound having ethylenic unsaturation (preferably at a terminal carbon position) and ($a$) an anhydride of a $C_2$ to $C_{18}$ carboxylic acid having an available alpha-hydrogen atom, such reaction being carried out under free radical forming conditions (specifically via the presence of aforesaid unique $H_2O_2$ "initiator") substantially in liquid state reaction mix and in a substantial molar excess of ( $a$) sufficient to effect primarily reaction of one equivalent of ($x$) with each carboxylic acid equivalent of such anhydride ($a$). It is a further object to provide the anhydride product of such process.

Other and further objects, features and advantages of the present invention will be apparent from the following disclosure and examples.

In appreciating fully the inventive concept here involved, it is important to understand that in the case of the reaction of reactant ($a$) with various different unsaturated reactants ($x$), in the presence of peroxide initiators or promoters ($b$), these various initiators and/or promoters ($x$) do have varying abilities relative to achieving good yields in the desired reaction between reactants ( $a$) and ($x$). Thus it will be seen in the disclosure immediately following that, in the case of certain terpenes ($x$) and in the case of some of the more reactive and lower molecular weight anhydrides ($a$), e.g., formed from $C_2 - C_5$ acyl groups, it does appear that the specific organic peroxide, tertiary-butyl peroxide ($b_1$) seems to produce a better yield or a better conversion of the terpene than the much less expensive hydrogen peroxide ($b_2$), even in certain instances involving the use of a greater proportion of the hydrogen peroxide. Of course, even if twice the molar proportion of hydrogen peroxide is used in a given reaction the cost of the hydrogen peroxide used is much less than the cost of the aforesaid organic peroxide ($b_1$). For a comparison, 22 pounds of the organic peroxide ($b_1$) has a cost of approximately $38.50 at the present time; whereas twice the molar proportion of hydrogen peroxide, i.e., 10 pounds has a cost of approximately $5.00. Comparing subsequent Examples 1 and 3, it will be seen that the difference in the amount of camphene converted is about 30 grams, using pounds it would be 30 pounds at 14 ¢ per pound or about $4.20 less camphene actually converted into the product. Of course, all of such camphene that is not converted is not all lost; and this calculation could be reversed to incorporate a comparable cost difference of about $4.00 if computed on the basis of the actual cost of ingredients actually converted into the final product. In any case, it is apparent that the principal item of cost is in the promoter and the mere fact that it appears that the yield is approximately 30 percent lower using hydrogen peroxide in Example 3 does not subtract from the fact that the product actually obtained in Example 1 happens to cost approximately 2 to 3 times more per pound. This difference is sufficient to take into consideration the expected fluctuations in the price per pound of the various ingredients over a substantial period of time in the future. Of course, if one were to require elaborate and expensive refinement and purification in the case of, for example, the camphene material in order to obtain an expensively purified camphene for use in the instant reaction, then it is conceivable that the somewhat improved yield obtained by the use of the organic agent ($b_1$) would be a much more significant factor economically.

The concept of the invention contemplates, in general, using various unsaturated reactants ( $x$) which are available at reasonable prices and, further, using the inorganic promoter, hydrogen peroxide ($b_2$), to obtain an unexpectedly and remarkably good yield so as to achieve wholly unexpected economic advantages in the practice of the instant invention. In the specific cases just mentioned relating to camphene, the lower yield obtained with hydrogen peroxide is significant and noticeable numerically, but it does not subtract from the economic advantages. Subsequently herein it will be demonstrated that practically the same yield is actually obtained using hydrogen peroxide, as is obtained using the organic peroxides, i.e., particularly with a number of the alpha-olefinic chain compounds; and in such situations the equally good yield as well as the economic advantages will demonstrate even more conclusively the remarkable character of hydrogen peroxide as a promoter in this specific reaction system.

The cyclo aliphatic anhydrides of the instant invention constitute a new class of compounds useful in a variety of chemical syntheses. These anhydrides are very reactive and may be converted by known methods to the corresponding acids, salts, esters, nitriles, amides, chlorides, or other derivatives. These anhydrides are especially useful when converted to esters as disclosed in my copending application, U. S. Ser. No. 570,772 filed Aug. 8, 1966. These esters are useful in perfumes.

These anhydrides may be described generally by the definition: A cycloaliphatic organic acid anhydride formed of $(x)$ at least one cycloaliphatic $C_6$ to $C_{15}$ hydrocarbon group wherein the only available bonds are provided in the form of single bonds on otherwise saturated exocyclic C atoms and $(a)$ at least one $C_2$ to $C_{18}$ acyl group each having at least one carbonyl group providing one bond for direct connection to the anhydride oxide atom and a second bond for direct connection to an alpha C atom which, in turn, provides a single bond for direct connection to one of said exocyclic group $(a)$ C atoms; such that the groups $(a)$ and $(x)$ are bonded together only vis a-vis said exocyclic group $(x)$ C atoms and said group $(a)$ alpha C atoms; the only atoms other than H and C atoms in each such acyl group $(a)$ being in the aforesaid carbonyl groups.

Also, the characteristic relative structural relationship of alpha, beta and gamma carbon atoms may be used in a more specific definition, wherein the new compound of the invention is defined as a cycloaliphatic organic acid anhydride characterized by the structure:

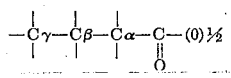

wherein $C_\gamma$, $C_\beta$ and $C_\alpha$ represent, respectively, gamma, beta and alpha carbon atoms and

represents an acyl carbonyl group having a bond available to satisfy the anhydride oxide equivalent: $(O)\frac{1}{2}$; said anhydride consisting essentially of $(x)$ from one to two cycloaliphatic $C_6$ to $C_{15}$ hydrocarbon groups each having at least one cyclic nucleus containing at least four nuclear C's and each such $(x)$ group having available bonds only in the form of single bonds on each of from one to three exocyclic saturated $C_\beta$ atoms each of which is in turn connected directly to a $C_\gamma$; the aforesaid group $(x)$ available bonds being satisfied by direct connection between each said $C_\beta$ atom and an equal number of $C_\alpha$ atoms in $(a)$ from one to three $C_2$ to $C_{18}$ acyl groups each having from one to two available bonds only in the form of single bonds each attached to C atoms each of which is attached to an acyl carbonyl-oxide group:

of said structure, such carbonyl-oxide groups containing the only atoms in such acyl groups $(a)$ other than H and C; and in the corresponding definitions for the derivatives thereof such as acids, salts, esters, ketones, nitriles, etc. the

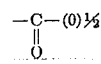

group in the above definition is replaced by

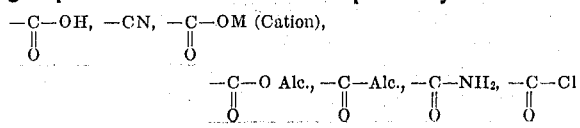

wherein M is any typical metal, ammonium amine, etc., mono or polyvalent cation and Alc. is the residue of any typical alcohol: Alc.-OH which can be $C_1 - C_{18}$ alkyl or alkenyl, glycol, polyglycol, carbotol, poly-OH (glycerol, pentaerythritol, sorbitol, etc.) as it appears above in either ester or ketone.

The adducts of this invention are prepared by adding the olefin and a small amount of a peroxide initiator gradually, over a period of several hours, to a large excess of boiling acetic anhydride (reaction-temperature is usually 135°–140° C.). If the olefin is a solid (such as camphene), it may be predissolved in part of the acetic anhydride before adding it to the reaction-mixture. It will be appreciated that this procedure provides for a very substantial molar excess of acetic anhydride at all times, beginning with the first incremental additions of the olefin and peroxy catalyst, and continuing to maintain the substantial molar excess of the acetic anhydride with subsequent incremental additions of the olefin and the catalyst. The following examples show adducts of about 2:1 in molar ratio of $(a)$ to $(x)$ [i.e., 1 acyl $(a)$ equivalent to each

$(x)$ equivalent]; but the reaction mix should have an $(a):(x)$ equivalent ratio within a practical range of about 10:1 to 1,000:1 (i.e., molar range of 5:1 to 500:1). Preferably, the $(a):(x)$ equivalent ratio of at least about 25:1 [Ex. 2], or better about 50:1 [Ex. 3] to about 100:1 is preferred as the minimum. The maximum $(a):(x)$ equivalent ratios of about 500:1 to 1000:1 are determined essentially by practical considerations of plant capacity, etc.; and all such ratios are on an "overall" basis, in view of incremental additions of $(x)$ and $(b)$ to $(a)$ which no doubt maintain still higher ratios at the immediate reaction scene. The specific adducts, olefin anhydrides, can be prepared as disclosed in my copending application, U. S. Ser. No. 570,736, filed Aug. 8, 1966.

The primary product of Examples 1–3 is probably a mixed anhydride, which disproportionates during distillation of the excess acetic anhydride to give the symmetrical cycloaliphatic carboxylic anhydride and acetic anhydride as indicated in Equation (A₃) below:

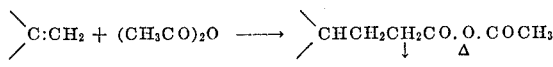

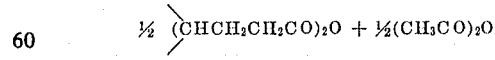

It is also possible that some telomerization should take place, giving higher molecular weight materials of the type

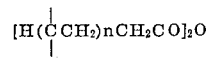

or the corresponding mixed anhydride.

According to the process of this invention, however, very little telomer is formed and the major product is the symmetrical 1:1 adduct (i.e., the adduct with $n = 1$).

The nature of the product can be elucidated by determining its saponification number (S.N.), from which can be calculated the ratio of acetic anhydride to olefin combined in the product; and by esterifying the product and separating the ester of the 1:1 adduct by distillation or chromatography. Equiv. of $Ac_2O$, i.e., $(CH_3CO)_2O$, combined in product * =

$$\frac{Wt.\ of\ product \times S.N.}{56{,}100}$$

Wt. of $Ac_2O$ combined in product* =
$$\frac{51 \times Wt.\ of\ product \times S.N.}{56{,}100}$$

*Includes also any small amount of unstripped free $Ac_2O$.

Mols of olefin combined in product =
$$\frac{Wt.\ of\ product - Wt.\ of\ Ac_2O\ in\ product}{Mol.\ Wt.\ of\ olefin}$$

Conversion of olefin = $\frac{Mols\ of\ combined\ olefin}{Mols\ of\ charged\ olefin}$ The ratio, (Equiv. of combined $Ac_2O$)/(Mols of combined olefin), will be one for the symmetrical 1:1 adduct, ($RR'CHCH_2CH_2CO)_2O$; or two for the mixed 1:1 adduct, $RR'CHCH_2CH_2COOCOCH_3$. The presence of telomers ($n = 2$ or more) in the product would lower the values of this ratio.

The reaction of Examples 1 through 3, is represented conveniently by the previously mentioned simplified Equation (A), or the specific Equations ($A_1$) and ($A_2$) below:

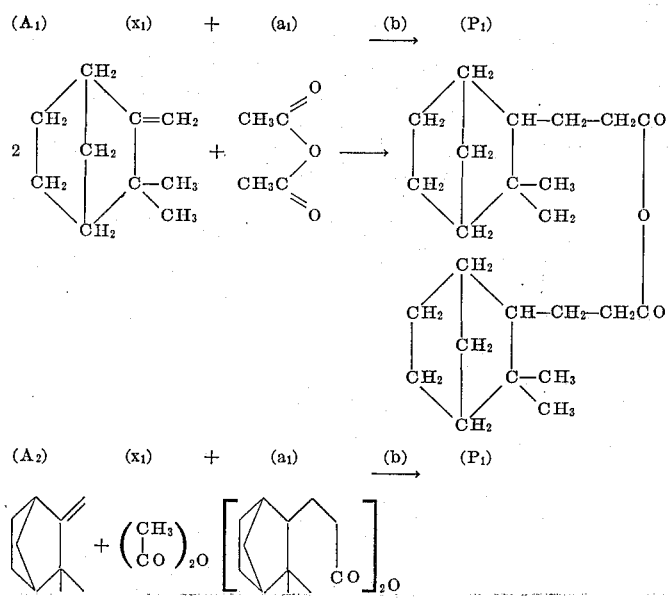

wherein (b) is a (peroxy) compound often referred to as a polymerization catalyst for (olefinic) addition polymerization, but is more accurately referred to herein as an initiator or promoter of free radical formation. In fact, the instant free radical formation is believed to involve the alpha-hydrogen on the acetyl group, in accordance with a reaction mechanism (M) which might be represented quite simply as follows:

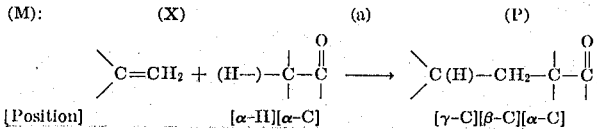

In the case of the olefin ($x$) having the exocyclic methylene group ($=CH_2$), the carbon atom thereof (which may be referred to as the alpha-carbon of an alpha-olefin) indicates the exocyclic carbon position, which is involved in or at which position one may identify the reactive ethylenic unsaturation; and it will be seen that such olefinic exocyclic C becomes a saturated beta- C in the ultimate product (P) wherein the C positions are referenced to the carbonyl group (C = O). The second C here shown in the olefin ($x$) which is also involved in the ethylenic unsaturation is intracyclic in camphene ($x_1$); and it becomes a saturated gamma-C in the product (P). It is believed that the reaction of the invention is predicated on the availability of the alpha-H (under the free radical promoting conditions here involved) on the alpha-C of the carboxylic acid reactant (a), which is preferably the anhydride of relatively lower molecular weight $C_2$ to $C_5$ alkanoic acids. Such anhydrides are preferred because they ordinarily possess better ability to dissolve the reactant ($x$) and most forms of organic initiators (b), and they react somewhat more readily. It should be noted that "abstraction" of the $\alpha$-H of (a) to the $\gamma$-C of (P) is herein promoted by inorganic $H_2O_2$ ($b_2$), as well as the organic free radical initiator ($b_1$).

In general, the anhydride reactants (a) may be formed of $C_2$ to $C_{18}$ alkanoic acids, e.g., acids containing 2 to 18 C atoms such as acetic ($a_1$), propionic ($a_2$), butyric ($a_3$), isobutyric ($a_4$), pentanoic ($a_5$), caproic ($a_6$), heptanoic ($a_7$), caprylic ($a_8$), nonanoic ($a_9$), capric ($a_{10}$), undecanoic ($a_{11}$), lauric or dodecanoic ($a_{12}$), tridecanoic ($a_{13}$), myristic ($a_{14}$), pentadecanoic ($a_{15}$), palmitic ($a_{16}$), heptadecanoic ($a_{17}$), stearic ($a_{18}$) acids, etc.; and preferably acids containing no ethylenic and/or acetylenic unsaturation and/or groups (other than the principal carbonyl group) which may tend to interfere with the reaction (e.g., hydroxy, etc.). The group attached to the (acid) carbonyl group may be branched, e.g., diethyl acetic ($a_{19}$), dioctyl acetic ($a_{20}$)

acids, etc., or straight chain hydrocarbon, with cyclic hydrocarbon groups, e.g., methylcyclohexyl, cyclohexyl ($a_{21}$), methylphenyl acetic or propionic ($a_{22}$) acids, etc. Also, one may use mixed anhydrides of the foregoing acids ($a_1$) through ($a_{22}$); and anhydrides of polycarboxylic acids, e.g., succinic ($a_{23}$), tetrahydrophthalic ($a_{24}$), methyl or ethyl succinic ($a_{25}$), adipic ($a_{26}$), sebacic ($a_{27}$), up to $C_{18}$ dicarboxylic acids, i.e., octadecanoic ($a_{28}$). Although the instant reaction is preferably carried out using only the essential reactants ($x$), ($a$) and ($b$) in the liquid reaction mixture, in those cases wherein higher molecular weight reactants are used, it may be and often is advantageous to employ anhydrous substantially inert hydrocarbon solvents such as toluene and/or hexane or heptane (to effect a liquid state reaction mixture) but usually also using heat and some pressure to effectively maintain reaction temperatures within the previously indicated range (and preferably at about 105° to 205° C.). Essentially, the anhydride reactants (a) used must have an available alpha-H (on the alpha-carbon next to the acyl carbonyl group). Such acyl group may contain one or more acyl carbonyl groups but must otherwise be inert in the reaction. In a mixed acyl anhydride ($a$), of course, only one alphanH is necessary; but preferably both monoacyl groups in the anhydride have alpha-H's.

Suitable cyclic olefins which can be used as the reactant ($x$) in the practice of this invention are as follows:

Methylene-cyclopentane ($x_6$)..
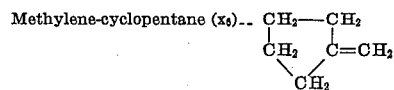

Methylene-cyclohexane ($x_7$)...
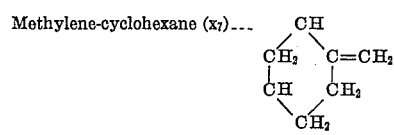

Divinyl-cyclobutane ($x_8$).....
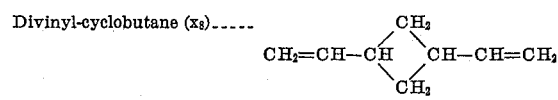

4-vinyl-1-cyclohexene ($x_4$) (Ex. 6).
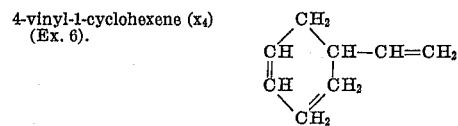

Methylene-cyclopentadiene ($x_{10}$) (fulvene).
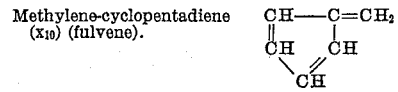

Benzofulvene ($x_{11}$).............
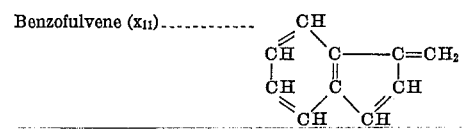

1,2,4-trivinyl-cyclohexane ($x_5$) (Ex. 7).
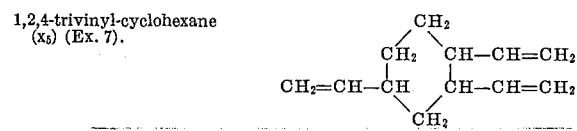

One preferred group of cyclic olefinic compounds (x) is the monocyclic terpenes:

Δ1,8(9)-p-menthadiene $C_{10}H_{16}$ limonene ($x_3$) (Ex. 5).
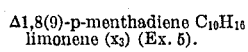
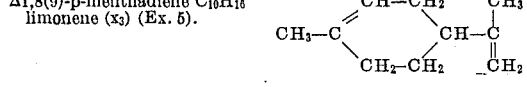

Beta-phellandrene ($x_{12}$) Δ1(7), 2-p-menthadiene $C_{10}H_{16}$.
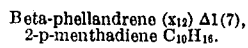
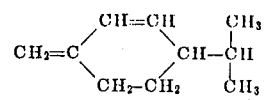

Sylvestrene ($x_{13}$) Δ1,8(9) m-menthadiene $C_{10}H_{16}$.
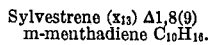
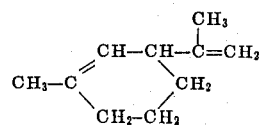

Beta-terpinene ($x_{14}$) Δ1(7) 3-m-menthadiene $C_{10}H_{16}$.
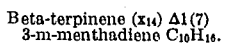
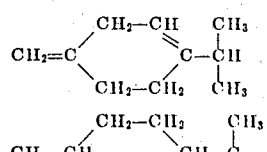

Δ-8(9)-p-menthene ($x_{15}$) $C_{10}H_{18}$.
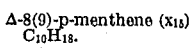
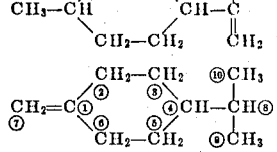

Δ-1(7)-m-menthene ($x_{10}$) $C_{10}H_{18}$.
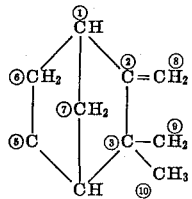

Among the terpenes, the preferred compounds are the bicyclic terpenes:

Camphene ($x_1$) ------------------
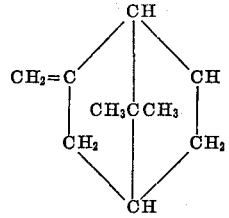

N.B.,—Encircled numbers indicate numbered carbon positions.

Alpha-fenchene ($x_{16}$) -------------
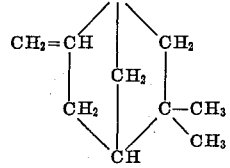

Beta-fenchene ($x_{17}$) -------------
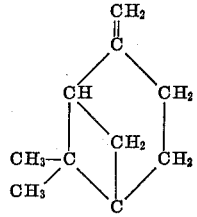

Beta-pinene ($x_2$)(Ex. 4) ----------
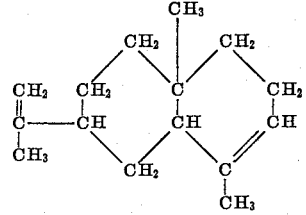

Sesquiterpenes ($C_{15}H_{24}$) are also used:

Selinene ($x_{18}$) --------------------

Also used in the invention are vinyl cycloheptane ($x_{19}$), methylene cycloheptane ($x_{20}$), etc.

As hereinbefore indicated, the cyclic reactant (x) has reactive ethylene unsaturation in a semicyclic position (preferably in the form of a =CH₂ group attached to the ring) but such unsaturation may be between a pair of exocyclic C's, as in the isopropenyl or vinyl groups. In each instance, the unsaturation preferably includes the unsubstituted methylene group, =CH₂; but reaction is also obtained at somewhat lower yields in the case of intracyclic terpene unsaturation and in the case of exocyclic unsaturation wherein both C's have some substituents, as in the case of Δ-1,4(8)-p-methadiene terpinolene (x₂₁).

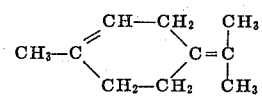

Santalene (x₂₂) C₁₅H₂₄.

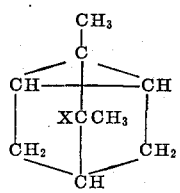

wherein X is C₆H₁₁ or —CH₂CH₂CH=C—CH₃
                                        |
                                        CH₃

Sesquicamphene (x₁ₐ)
8-Δ-1- pentenyl-camphene
wherein X₁ is C₆H₁₁ or
—CH₂CH₂CH₂CH₂CH=CH₂.

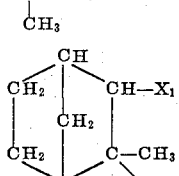

Additional ethylenically unsaturated reactants (x) used to advantage herein (according to the procedures herein) include:

XXX. C₂ – C₂₀ alpha-olefins; i.e., mono-olefins 1-dodecene (x₃₀), and ethylene (x₃₁), propylene (x₃₂), butylene (x₃₃) and all such C₂ – C₂₀ alkene-1 or alpha-alkenes (x₃₀) through (x₅₀). Preferably, 1-octene (x₃₉), 1-decene (x₄₁), 1-dodecene (x₃₀) and 1-tetradecene (x₄₄) may be used alone or in admixture, exactly as described in Examples 8–11, in order to obtain the corresponding decanoic, lauric, myristic and palmitic acid derivatives. Lower boiling C₂ – C₇ alpha-olefins are reacted under pressure at substantially 135°–140° C. using the same procedures.

XXXI. C₂ – C₄ alkenyl (C₂ – C₄) alkanoates, (x₅₁), e.g., vinyl acetate (x₅₂), allyl acetate (x₅₃), methallyl propionate (x₅₄), vinyl butyrate (x₅₅), crotyl acetate (x₅₆) may all be used in place of 1-dodecene in Examples 8 and 9, preferably using at least a few atmospheres pressure to effectively maintain a reaction (and/or reflux) temperature of 135°–140° C. in otherwise exactly the same procedure as that described in such Examples.

XXXII. In each of Examples 8–11 and previous paragraphs (XXX) and (XXXI), it is found that the best yields of 1:1 adducts are obtained using preferably about 100 equivalents of (a) to 1 equivalent of (x) (and at least about 50:1 equivalent ratio seems particularly advisable).

XXXIV. Repeating the procedures of paragraphs (XXX) and (XXXI), and Examples 8–11, using (a₂), (a₃), (a₄) and/or (a₅), substantially under temperature reaction conditions of reflux (or at 150° C.) each as specified herein, will result in excellent yields of 1:1 adducts. Also, the higher (a) reactants of processes herein are used with the olefins (x) of paragraph (XXX) hereof to obtain 1:1 adducts.

XXXV. C₄ – C₁₈ alkenoyl nitriles (x₅₇), acids (x₅₈), chlorides (x₅₉), C₁ to C₆ alkyl esters, (x₆₀) are used exactly as the unsaturated compounds (x₃₀) of Examples 8–10 or the esters (x₅₁), using undecylenic acid (x₆₀) [Ex. 12] undecenonitrile (x₆₁), methyl undecylenate (x₆₂), ethyl undecylenate (x₆₃), butyl undecylenate (x₆₄) each in 1 mol proportions to 0.3 mol of H₂O₂ active and at substantially 135°–140° C.; but preferably using 100 to 150 molecular equivalents of reactant (a) in order to effect maximum conversion to 1:1 (equiv.) adducts.

XXXVI. Additionally, the higher alkyl alkenoates (x₆₅), alkenyl alkenoates (x₆₆) and/or alkenyl alkanoates (x₆₇), having not more than about C₂₀ groups on either side of the ester —COO— group can be used. In contrast to comparatively readily polymerizable (x) reactants such as those of paragraphs (XXXI) and (XXXV) hereof, the foregoing may be used effectively in equivalent ratios of (a) to (x) as low as 10:1, 20:1, and 25:1 with minimum telomer formation; and, likewise, with the higher and more complex (a) reactants of paragraph (XXXIV). For example, methyl linoleic (x₆₈), ethyl linolenic (x₆₉), methyl oleate (x₇₀), oleyl acetate (x₇₁), linolenyl propionate (x₇₂), vinyl oleate (x₇₃), etc., may each be used, as one mol (x) predissolved in some (a₁) acetic [or propionic (a₂), butyric (a₃), isobutyric (a₄) or valeric (a₅)] anhydride for reaction with a total of 50 equivalents of (a) at reflux temperature [and using 0.3 mol H₂O₂ (b₂) active], for 8 hours addition and 8 more afterwards, in order to obtain good adduct yields. With polyunsaturated (x₆₈), (x₆₉), (x₇₂), (x₇₃), the formation of 1:1 adducts is more difficult to evaluate, but the entrance into the instant reaction by the more active unsaturation tends to predominate.

XXXVII. Additionally, cycloaliphatic [C₆, C₁₀, C₁₅, C₂₀] (ethylenically unsaturated) esters, acids, chlorides, etc., may also be used as (x), e.g., any of the C₁₀ unsaturated terpene alcohols esterified with C₂ to C₆ alkanoic acids, e.g., acetic (x₇₄) and any of the C₁₀ unsaturated terpene carboxylic acids [and/or unsaturated adducts (P) of terpenes hereof] esterified with C₁ to C₆ alkanols (x₇₅) are used as the reactant (x) herein, exactly as described for (x) in the previous paragraph, e.g., using the ethyl ester of (P₅), as (x₇₆), for reaction with said excess acetic anhydride (a₁) and/or using abietic acid (x₇₉), methyl abietate (x₈₀), and other tall oil fatty acids again with acetic anhydride (a₁), all as described in Example 3 hereof, effect the adduct formation. In this respect, it is important to note that, although the adduct reaction Equation (A) goes more easily and effectively with alpha-olefinic groups, or at least ethylenic unsaturation at an exocyclic carbon herein, in reactant (x), and such unsaturation at exocyclic olefinic groups tends to dominate (when present), it is found that, when only intracyclic unsaturation is present [i.e., abietic compounds (x₇₉), (x₈₀) and/or intracyclically unsaturated terpenyl (x₇₇), (x₇₈) compounds] such intracyclic unsaturation is functional significantly for the alpha-substitution on reactant (a). Also, conjugated double bond (ethylenic) unsaturation within aliphatic chains, as in the aforesaid linoleic (x₆₈) and linolenic (x₆₉) derivatives is found to be very functional in (x) reactants hereof. In fact, plural ethylenic unsaturation in aliphatic poly-olefins, whether or not some unsaturation is at an alpha-position and/or in a conjugated double bond arrangement, is found to be suitable for use herein. For example, butadiene ($x_{81}$), contains sufficiently reactive poly-unsaturation to effect plural alpha-substitution on two equivalents of ($a$). This is also true of diallyl phthalate ($x_{82}$) which is an ester, not an olefin. Other recognized (addition polymeric) olefinic monomers such as diisobutylene ($x_{86}$), etc., are each used in place of ($x_1$) in Example 3 with 0.3 mol $H_2O_2$ for each equivalent thereof to obtain good results.

Although it is generally preferable to employ, as ($x$), a $C_2$ to $C_{20}$ organic compound containing no atoms other than C and H except those in such essentially inert groups as —COO—, —CO—, —O—, —CN, —CO—Cl groups, it will be appreciated that in esters the ($C_2$ to $C_{20}$)—COO— group is often connected directly to a $C_1$ to $C_{20}$ alcoholic group or residue (and such is often the case with ether —O— and keto —CO— groups). Di-butenyl ether or ketone represent the lower molecular weight groups of these categories usable also in the invention.

The invention hereof thus involves a process of synthesizing an organic linkage having the structure (PP):

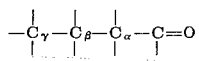

wherein $C_\gamma$, $C_\beta$ and $C_\alpha$ represent, respectively, gamma-, beta and alpha-carbons referenced to the

group in said structure, which consists in contacting ($a$) substantially at least 10 to 500 molecular equivalents of an acyl anhydride having the structure ( $aa$):

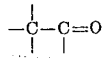

contemporaneously with ($b$) substantially 0.05 to one mol, but preferably 0.15 to 0.5 mol of $H_2O_2$, and ($x$) substantially one molecular equivalent of an ethylenically unsaturated pair of C's having the structure ( xx):

in a liquid mix at substantially 75° to 205° C. under free radical promoting conditions initiated substantially by such $H_2O_2$ ($b$) and continuing such heating to substantially complete decomposition of such $H_2O_2$, thereby effecting chemical combination of ($aa$) and ($xx$) wherein $C_x$ and $C_y$ of ($xx$) become, respectively $C_\gamma$ and $C_\beta$ of said structure (PP) and the double bond of ($xx$) is satisfied, in part, by abstraction of the alpha-hydrogen of (aa) to the $C_x$ of ($xx$) which, in turn, becomes the $HC_\gamma$ of ( PP) and, in part, by the free radical of $C_\alpha$ o (aa) that is created by such abstraction of the alpha-H and is satisfied by $C_y$ of ($xx$) converted thereby to $C_\beta$ in the ultimate structure (PP), said process being carried out in an essentially anhydrous and inert system except for the reacting structures (aa) and ($xx$), each of which is composed of no atoms other than H and C except those in groups selected from

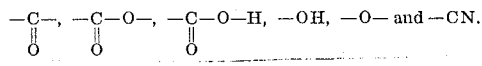

The products of the invention are the anhydrides of the process ( and/or their polymers) and their acids resulting from the hydrolysis thereof (which hydrolysis may also give esters).

The peroxy agents ($b$) are used in relatively substantial proportions relative to the olefin ($x$). The previous examples show (x):(b) equivalent ratios [i.e., computed as ratios of each

($x$) to each —O—O— ($b$)] that are substantially 1:0.3 to substantially 1:0.15, but the actual equivalent ratios which may be used range from a practical minimum effective amount in the neighborhood of 20:1 to 100:1 (below which no significant benefit is ordinarily obtained from the use of the peroxy agent) to a practical maximum of substantially 1:1, although perhaps 2:1 is more practical in most instances, depending on catalyst costs since there is ordinarily not more than nominal advantage obtained in using ratios above substantially 3:1 to 2:1.

A unique and significant feature of the instant invention resides in a distinction drawn between the use of inorganic $H_2O_2$ ($b_2$) and the organic catalyst initiators, ( $b_1$ ), which latter agents ($b_1$ ) might be expected to have some compatibility with the organic reactants ( $x$) and/or ($a$) even if the art appears to suggest undesirable reaction mechanisms, e.g., Equation (B), supra. In the instant use, however, $H_2O_2$ should be expected to function, if at all, in any of several undesirable fashions, e.g., Equations (B) supra and/or ( G) or (H) infra. The apparently incompatible concentrated (aqueous) $H_2O_2$ ($b_2$) is added to anhydride ($a$), separately from organic ($b_2$), using reaction temperatures often above 100° C. at which decomposition and/or volatilization and/or some other undesirable function of the agent ($b_2$) might be expected to occur.

In contrast it has been found that, although the $H_2O_2$ ($b_2$) does not give quite as good a yield herein as an equal molar proportion of organic agent ($b_1$); the $H_2O_2$ ( $b_2$ ) is so much less expensive than the organic agents ( $b_1$ ) that the cost advantages far exceed the disadvantage of a lower yield, and the yield may be very inexpensively increased by using more $H_2O_2$.

Although the present invention contemplates the use of $H_2O_2$ ( $b_2$ ) as an essential and predominating catalyst or initiator ( $b$), i.e., more than substantially 50 mol percent and preferably 75 to 100 mol percent of ( $b$); the use of the organic peroxy agents, e.g., ($b_1$) in the remainder of the overall molar proportion for ( b) is permitted (and even recognized as affording advantages which compensate for the added expense of such organic agents, when used in comparatively smaller molar proportions). In such instances $H_2O_2$ ($b_2$) is still added separately, of course. The organic agent ($b_1$) is predissolved, when used, since the use of organic peroxides and/or hydroperoxides has certain advantages in that these materials may be more readily dissolved in most of the anhydride reactants ($a$) and/or the olefin reactants ($x$), but the organic agents are often quite expensive, so their use in a solution in order to increase their convenience and effectiveness is significant.

The process of this invention may be repeated with comparable results using a corresponding minute molar proportion of any of the following organic "peroxy" free radical promoting agents ($b$) (in combination with major proportions of $H_2O_2$ ($b_2$)):

tertiary butyl peroxide ($b_1$)
t-butyl hydroperoxide ($b_3$)
benzoyl peroxide ($b_4$)
cumene hydroperoxide ($b_5$)
tetralin hydroperoxide ($b_6$)
diisopropyl benzene hydroperoxide ($b_7$)
t-butyl perbenzoate ($b_8$)
acetyl peroxide ($b_9$)
urea peroxide ($b_{10}$)
methyl ethyl ketone peroxide ($b_{11}$)
diisopropyl ether peroxide ($b_{12}$)
diisopropyl peroxy dicarbonate ($b_{13}$)

It will be understood that some of the more readily decomposed organic peroxides such as ($b_{13}$) above function more effectively at temperatures below the specified 135°–9° C. and corresponding adjustments in the reaction temperatures are made to achieve optimum operating conditions for the various organic peroxides ($b_1$) and ($b_3$) through ($b_{13}$), with the major proportion of $H_2O_2$ ($b_2$), which appears to function well over a substantial temperature range.

The reaction temperatures in the case of a major reactant ($a$) such as acetic anhydride are preferably the reflux temperature for the acetic anhydride, at least in situations wherein the acetic anhydride is capable of dissolving all or substantially all of the olefin ($x$) at such reflux temperatures, which are substantially 134°–9° C. The reaction temperature may, however, range from a minimum effective temperature that may be as low as perhaps 75° to 100° C., although reaction temperatures above 100° C. are preferred in most instances and a maximum practical reaction temperature of about 200° C. (e.g., range of substantially 105° to 205° C.) is ordinarily not excessive for good results in the practice of the invention. The upper reaction temperature will often be limited primarily (as well as easily controlled), under atmospheric pressure, by the reflux temperature of the predominating material, i.e., usually the anhydride, e.g., ($a_1$) acetic, b.p. 134°–9° C.; ($a_2$) propionic, b.p. 168° C.; ($a_3$) or ($a_4$) butyric or isobutyric, b.p.'s. 192°, 182.5° C.; and ($a_5$) valeric, b.p. 205° C., anhydrides. Even though ($x_1$) camphene, b.p. 157° C. or ($x_{12}$) beta-phellandrene, b.p. 176° C. may have lower boiling points than some anhydride reactants ($a$), the resulting products (P) will not and slow incremental additions of the olefin ($x$) and/or initiator ($b_2$) $H_2O_2$ will have only a nominal effect on the reflux condition. Subsequent stripping of the excess anhydride ($a$) and/or inerts or unreacted olefin ($x$) may be and usually is completed at reduced pressures, and various pressures may also be used for carrying out the entire reaction within substantially the overall temperature limits hereinbefore indicated. The peroxide agent ($b$) i.e., $H_2O_2$ with or without an organic peroxide is a material which is decomposed by heat at various rates depending upon the overall conditions and, of course, the actual temperature to which this agent ($b$) is subjected. Ordinarily, the reaction system is set up under operating conditions which will afford a preferred rate of decomposition for the catalyst (without drastic or explosive decomposition), so that the function of the catalyst in promoting free radical formation will take place under optimum reaction conditions for maximum yield. The cost of materials involved is ordinarily such that the time of reaction is not as critical a consideration as the overall yield of the product, and similar considerations of this nature; but the operating temperature employed is such that the overall reaction time will be reduced to a practical figure, at least to the extent that this may be done without unduly subtracting from certain essential features such as the percent of yield. In this respect, the subsequent Table I indicates a number of variables for a given reaction system (i.e., camphene and acetic anhydride), as a guide for carrying out the specific reaction described and/or comparable reactions using other reactants. In Table I it will be seen that the top portion thereof designates in successive columns from left to right the run number, the camphene purity, the mol ratio of ($a$):($x$), the reaction times (for addition and for overall time), and the ultimate stripping temperature employed. In the lower half of Table I, designated Table IA, it will be seen that the columns, from left to right, indicate the run number, the product saponification number, and the conversion computations which indicate the number of equivalents of acetic anhydride reacted, the number of mols of camphene reacted, the percent camphene reacted and the percent of 1:1 or "equi-molar" adduct obtained in the product. The other reaction conditions of substantially acetic anhydride reflux temperature, incremental addition of olefin and peroxide, etc., specifically described in Examples 1 through 3 hereof are used in the various Runs designated on Table I, unless otherwise specified on such Table.

The use of the foregoing acid anhydrides herein is easily demonstrated, for example, by carrying out the procedure of Example 3 hereof using the anhydrides ($a$) of a cut of saturated coconut oil fatty acids ($a_{10}$), ($a_{12}$), ($a_{14}$), ($a_{16}$) and ($a_{18}$), in the relative proportions found in the coconut oil, such anhydrides being formed initially by refluxing the acids with acetic anhydride (i.e., for about 10 hours and then stripping off the lower boiling acetic anhydride). The resultant anhydride mixture (50 equivalents) is maintained at substantially 150° C. during (8 hours of) incremental separate additions of camphene ($x_1$) and hydrogen peroxide ($b_2$) in the amounts specified in Example 3 (with the camphene predispersed in about 390 g. of such anhydride mixture at about 50° C.). The 150° C. temperature is maintained for an additional 16 hours and then pressure is reduced to strip off the unreacted anhydride (at substantially 150° C./0.05 mm. Hg.) so as to obtain the product mixture (P₂):

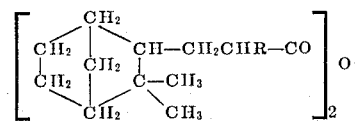

wherein R is a $C_8$ to $C_{16}$ alkyl group.

The above procedure can be repeated using lauric anhydride ($a_{12}$) as the reactant ($a$), and the resulting product (P₃) has the foregoing formula (P₂) wherein R is a decyl group. Repeating the same procedure but using as reactant ($a$) myristic anhydride ($a_{14}$) one obtains a product (P₄) wherein R of the formula (P₂) is dodecyl group. In each of the foregoing procedures the separation of the excess anhydrides ($a_{12}$) and/or ($a_{14}$) to obtain the products ($P_3$) and ($P_4$) is simplified because of the absence of product mixtures, and also higher yields are obtained (or at least are ascertainable).

The foregoing procedure may be repeated using ($a_9$) nonanoic anhydride; stripping off of excess ($a_9$) is effected at substantially 100° C./0.04 mm. Hg. The same conditions are used for mixtures of ($a_9$), ($a_{11}$), ($a_{13}$), ($a_{15}$) and/or ($a_{17}$), or for the individual anhydrides. In contrast, a better yield is recoverable using individually or mixtures of anhydrides ($a_8$), ($a_7$), ($a_6$) and/or ($a_5$) and stripping off the excess anhydride at 160° C./18 mm. Hg.

In the case of ($a_2$), ($a_3$) and/or ($a_4$) the procedure of Example 3 is followed exactly (using corresponding molar proportions), including refluxing during reaction and stripping off excess anhydride as described, the reaction temperatures being 168° C. ($a_2$), 192° C. ($a_3$) and 182.5° C. ($a_4$), respectively, obtaining the corresponding anhydrides of the camphene propionic ($P_5$), -butyric ($P_6$) and -isobutyric ($P_7$) acid adducts.

Corresponding results are obtained by first preparing as above, anhydrides of acids ($a_{19}$) through ($a_{28}$), except that the anhydrides of dicarboxylic acids, ($a_{23}$) to ($a_{28}$), will form the corresponding di-adducts at each of the alpha carbon positions present in such dicarboxylic acid molecules. Thus, the product ($P_8$) obtained using one or more anhydrides ($a_1$) through ($a_{22}$) has the formula:

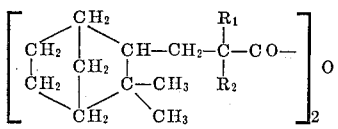

(wherein for cycloaliphatic reactants ($a_{21}$) $R_1R_2$ becomes a divalent pentamethylene group, but in general) wherein each $R_1$ and $R_2$ may be H or a saturated aliphatic hydrocarbon, i.e., alkyl, aralkyl, alkaryl, cycloaliphatic, etc., and the total number of carbon atoms in $R_1$ plus $R_2$ is not more than about 16. The product ($P_9$) obtained using succinic ($a_{23}$) or other dicarboxylic acids ($a_{24}$) et seq. has the formula:

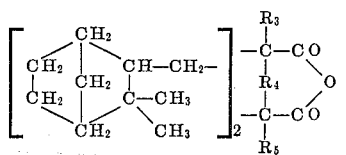

wherein $R_4$ can be a bond between alpha C's (as in succinic) or a divalent, aliphatic saturated hydrocarbon group and each $R_3$ and $R_5$ can be H or an aliphatic saturated hydrocarbon group; and the total number of C's in $R_3$ plus $R_4$ plus $R_5$ is not more than about 14, and $R_3R_5$ is tetramethylene for reactant ($a_{24}$). The procedure may also be repeated using succinic ($a_{23}$) and adipic ($a_{26}$) anhydrides in one-half the molar amount of the acetic anhydride, and it is found that the excess anhydride is removed to obtain the resultant adducts: camphene-succinic anhydride ($P_{10}$), camphene-succinic-adipic-anhydride mixture ($P_{11}$) or camphene-adipic anhydride ($P_{12}$) depending upon the selection of the starting reactant ($a$).

As shown above, the general procedure of Example 3 is used with variations but using 30 percent hydrogen peroxide ($b_2$) as an initiator or catalyst for the promotion of free radicals. By comparison of such results with Table 1, tertiary butyl peroxide ($b_1$) appears to be the better free radical promoting agent ($b$) for use in the instant reaction (A) from the point of view of reaction yield or percent conversion of ($x$), reaction efficiency generally and/or on the basis of minimum equivalents (or mols) of ($b$) per equivalent of ($x$). Other organic agents ($b$) may be used in place of ($b_1$) to obtain comparable excellent results in the previous Examples 1 and 2. The successful use of hydrogen peroxide ($b_1$), however, has also been demonstrated herein, and it will be appreciated that hydrogen peroxide, as such, is readily available in various relatively inexpensive non-aqueous (e.g., ethanol) as well as aqueous concentrations, generally ranging from about 30 percent by weight to approximately 70 percent, or even 90 percent by weight. The amount of water or other volatile (e.g., ethanol) actually incorporated at any time with a given typically small incremental addition of hydrogen peroxide (according to the procedures of Example 3 and the Demonstrations hereinbefore described) is so very small, that such water or volatile carrier will not change the substantially anhydrous character of the reaction mixture. The acetic anhydride ($a_1$) or other acid anhydride ($a$) is present initially in a sufficiently great quantity so that the water will react rapidly with the anhydride to give a very low concentration of free acetic or other organic acid and the hydrogen peroxide will carry out its function in an essentially organic medium (i.e., essentially the acid anhydride plus a very small amount of free acid and nominal amounts of product already formed and the incremental portion of olefin added contemporaneously with the addition of hydrogen peroxide).

The hydrogen peroxide in such essentially organic medium appears to react such that it functions effectively for the promotion of free radicals in the manner desired. According to Table 1, the actual yield obtained, as the basis of percent conversion of (1 mol) of camphene ($x_1$), using (0.3 mol) hydrogen peroxide ($b_2$) is substantially 60 percent of that obtained using about one-half the molar proportion of an organic peroxide, such as (0.15 mol) tertiary butyl peroxide ($b_2$), but the use of hydrogen peroxide ($b_2$) affords substantial economic advantages in spite of this "apparent" inferiority. This is so primarily because the $H_2O_2$ ($b_2$) in any of its conveniently available concentrated (30, 50, 70, 90 percent) forms is so much less expensive that the organic initiators ($b$), i.e., peroxides, hydroperoxides, ozonides, etc. Also, the approximately 30 percent lower conversion of camphene ($x_1$) to the adduct ($P_1$) using $H_2O_2$ does not mean that the entire proportion of camphene ($x_1$) not converted (in Ex. 3) is lost or wasted, since the same can be reprocessed with the acetic anhydride ($a_1$), and without significant change in essentials of the stripping operation required to remove the excess reactant ($a_1$). Not only is the price per pound of an organic peroxide such as t-butyl peroxide ($b_2$) many times higher than that of ($b_1$) $H_2O_2$ (active basis); but 0.15 mol of organic ($b_2$) weighs about twice as much as 0.3 mol of ($b_2$) $H_2O_2$ (active). Hence, the greater molar or equivalent ratio for ($b$): ($x$) that is preferred for use of $H_2O_2$ and, also, the greater equivalent ratio for ($a$):($x$) that is preferred for best results with $H_2O_2$ will both involve only nominal cost disadvantages that are far outweighed by the expense alone of the organic initiator.

It will also be appreciated, however, that particularly in unusual situations involving perhaps some specific operating problem and/or olefin $(x)$:anhydride $(a)$ reaction system, it is possible to obtain substantially the foregoing economic operating advantages with superior percent olefin conversion yields also, simply by using for a given mol of olefin $(x)$, the preferred 0.3 mol $H_2O_2$ $(b_2)$ plus a small amount of organic peroxide $(b_1)$, e.g., such as about 0.015 or 0.03 mol, which would effect an approximate organic initiator cost saving of some 80 to 90 percent but which will ordinarily effect disproportionately greater increase in the percent yield (conversion), when such is expedient or desired. Actually, up to 25 mol percent or even approaching 50 mol percent of the total initiator $(b)$ could be an organic peroxy compound [dissolved in the olefin $(x)$, etc.] for purposes of effecting improved yields; but it is believed that the maximum economic advantages obtained by the use, in combination, of organic peroxy and $H_2O_2$ $(b_2)$ initiators involves the foregoing approximately minute 5 mol percent to 10 mol percent (i.e., 0.015 to 0.03 mol) of the organic initiator $(b_1)$ predissolved in the olefin $(x)$ as shown. Without being limited to any theory, it is believed that contemporaneous slow incremental addition of $H_2O_2$, in this instance will effectively cooperate with rather than subtract from the better yield-producing properties of the organic initiator, substantially beyond that which could be expected from the small molar percent used.

The procedures of each of the following Examples 4 through 7 may be repeated using, instead of acetic anhydride $(a_1)$, propionic anhydride $(a_2)$, and comparable results obtained, the reflux reaction temperature, however, being about 168° C. Repeating the same procedure using butyric anhydride, $(a_3)$ and/or $(a_4)$, one obtains comparable results using the reflux temperature (about 182°–192° C.); but somewhat better yields are obtained if a controlled temperature for the reaction is maintained at approximately 150°–160° C. Comparable results are obtained, however, using various other anhydrides $(a_5)$ through $(a_{28})$, in the previous procedures disclosed herein, but using in place of camphene $(x_1)$, the cyclic olefins of Examples 4 and 5, namely, $\beta$-pinene $(x_2)$ and d-limonene $(x_3)$, which are the olefins used in Examples 4 and 5. Comparable results are also obtained using the organic peroxy compounds $(b_1)$ and $(b_3)$ through $(b_{13})$ in the proportions actually described in Examples 4 through 7 (in the combinations with $H_2O_2$). The use of hydrogen peroxide $(b_2)$ alone in Examples 4 through 7 results in good yields at significant economic advantages, although "numerically" only about 60 percent as high yields as are described in Examples 4 through 7, using organic $(b_1)$ alone.

Examples 1, 2 and 3 hereof can be repeated using valeric anhydride $(a_5)$ in place of $(a_1)$, and refluxing at 205° C. and the resulting alpha-(camphanyl)-valeric anhydride $(P_{14})$ is obtained.

It will thus be seen that the process of the invention is essentially that of producing an alpha-substituted acyl anhydride; and in defining such compound herein the alpha-substituent may be identified by "alpha" followed by the identification of the alpha-substituent in brackets or parenthesis, e.g., alpha-[$C_{10}$ terpenyl substituted]-acetic anhydride, or —$C_2$ to $C_5$ alkanoic acid anhydride, in which latter case the anhydrides $(a)$ are acetic to valeric, all boiling substantially within the range of 105° to 205° C. In the case of valeric anhydride $(a_5)$ (b.p. about 205° C.) the reflux temperature is considered to be at the top of the practical range of 100°–105° up to 200°–205° C. (which is a desired condition for a generally anhydrous reaction scene), although even within this preferred range it appears that better yields are obtained at substantially 130° to 170° C., i.e., using $(a_1)$, $(a_2)$, $(a_3)$, $(a_4)$ and/or $(a_5)$, which does not involve refluxing at atmospheric pressure but is still a controlled reaction temperature, and one which need not be exceeding in subsequent sub-atmospheric pressure stripping. Additional embodiments of the process and products of the invention, wherein the ingredients are designated by the previously identified subscripts to $(a)$, $(x)$, $(b)$, etc., include:

II. Repeating the procedure of Example 3 using $(a_2)$ in the same (25 mol) proportion and temperature (i.e., 135°–140° C., but without refluxing), the product obtained in comparable yield is: $(P_{21})$ alpha-(dihydrocamphenyl)-propionic anhydride.

III. Repeating the foregoing procedure (II) using 1 mol of $(x_6)$ instead of $(x_1)$, a comparable result is achieved in obtaining $(P_{22})$ Alpha-(cyclopentyl methyl)-propionic anhydride; and, likewise, (IV) with $(x_7)$ the alpha-(cyclohexylmethyl) propionic anhydride $(P_{23})$ is obtained;

IV. with $(x_{20})$ methylenecycloheptane, the product $(P_{24})$ is alpha-(cycloheptylmethyl) propionic anhydride:

V. with $(x_{10})$ and $(x_{11})$ respectively the exocyclic $=CH_2$ becomes the alpha-methylene linkage, i.e., —$CH_2$— between the $(x_{10})$ and $(x_{11})$ cycloolefin residues and the alpha-carbon of the propionic anhydride in $(P_{25})$ and $(P_{26})$, respectively;

VII. with $(x_{16})$, $(x_{17})$ and $(x_2)$ in place of $(x_1)$ in this procedure, comparable yields are obtained as: $(P_{27})$, $(P_{28})$, $(P_{29})$, respectively the propionic anhydride alpha-substituted, via the methylene linkage at the formerly unsaturated carbon of alpha-fenchene, Beta-fenchene and Beta-pinene; and VIII. repeating the foregoing with $(a_3)$ to $(a_{22})$ anhydirdes of such monocarboxylic acids and $(x_8)$ alpha-substitution is obtained in part on the foregoing 1:1 adduct basis, e.g., $(P_{30})$ alpha-(Vinylcyclobutylethyl)-propionic anhydride or alkanoic anhydride; but the reaction tends toward an adduct of 1 mol of $(x_8)$ per 2 molar equivalents of $(a_3)$ through $(a_{22})$, e.g., $(P_{31})$ Generally represented:

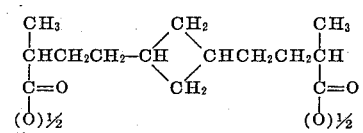

which is theoretically comparable to and obtained in yield comparable to those of the product of Example 7, which could be represented:

$(P_{32})$

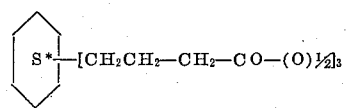

*S = Saturated

In contrast, (IX) if a dicarboxylic acid anhydride is used, in accordance with the procedures herein, but with essentially monofunctional $(x)$ compounds such as $(x_1)$ through $(x_3)$, $(x_6)$ through $(x_{22})$, the results are comparable with essentially 2 mols of $(x)$ adding to one mol of such dicarboxylic acid anhydride ($a_{23}$) through ($a_{28}$); but (X) using di-functional ($x_8$) an essentially equimolar addition product of ($x_8$) and ($a_{23}$) through ($a_{28}$) is obtained and (XI) using tri-function ($x_5$) with such dicarboxylic acid anhydrides ($a_{23}$) through ($a_{28}$) (in the procedure of Example 7 hereof), the product is essentially an ($x$): ($a$) adduct in 2:3 molar proportion, but in both (X) and (XI) hereof, the yields include the other possibilities, i.e., 1:1, 1:2, 2:1, etc., and this aspect of identification is complicated, even though it is possible to ascertain that the dominating reaction is alpha-substitution.

In the case of the monocyclic ($C_{10}$) terpenes, i.e., those containing 10 carbon atoms, the $C_{10}H_{16}$ ($x_3$), ($x_{12}$), ($x_{13}$), ($x_{15}$) and ($x_{21}$) terpenes are preferred in one category, and the $C_{10}H_{18}$ ($X_{15}$) and ($x_{10}$) in the other. The products are respectively alpha-($C_{10}H_{17}$ substituted)- and alpha-($C_{10}H_{19}$ substituted)- acyl compounds. The bicyclic terpenes preferred are ($x_1$), ($x_{10}$), ($x_{17}$) and ($x_2$), which result in alpha-($C_{10}H_{17}$ substituted)- acyl compounds. Preferably the terpenes used have a reactive exocyclic methylene ($=CH_2$) carbon which is unsubstituted (as in the so-called alpha- or primary olefin); but lower $C_1 - C_4$ alkyl groups on such exocyclic C are not precluded, e.g., ($x_{21}$) or ($x_{22}$). Likewise, although vinyl cycloaliphatic hydrocarbons ($x_8$), ($x_4$), ($x_5$), etc., produce good results herein, it is found that particularly in the case of the various monocyclic terpenes ($x_3$), ($x_{13}$), ($x_{15}$), as well as bicyclic terpenes ($x_{18}$), the unsaturation may be between two exocyclic C's, as in the typical isopropenyl group -C($CH_3$) = $CH_2$ instead of a simple unsubstituted vinyl group $-CH = CH_2$.

Although previously indicated, the compounds of the invention can be described on the basis of the addition products of so many ($x$) groups to so many ($a$) groups, at the alpha-position on ($a$); and the resulting ($x$) group for any given starting reactant ($x$) differs only in that a reactant ($x$) unsaturation is satisfied by one H and one bond (which, in turn, attaches to the acyl group as a replacement for the original alpha-H), it is apparent that a fundamental structure in the product is

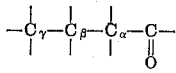

and preferably

the resultant $C_6$ to $C_{15}$ hydrocarbon group ($x$), which contains only C and H atoms, and which has no acetylenic unsaturation and not more than one or two ethylenic unsaturation. Benzenoid unsaturation is not excluded and not considered functional or reactive herein. On the foregoing basis, of course, the reactant ($x$) must be represented as

which is a $C_6 - C_{15}$ cycloaliphatic olefin, differing from the group ($x$) definition only in that there is the addition unsaturation (and the alpha, beta and gamma C designations are changed). Preferred terpene reactants and "groups" compare, as follows:

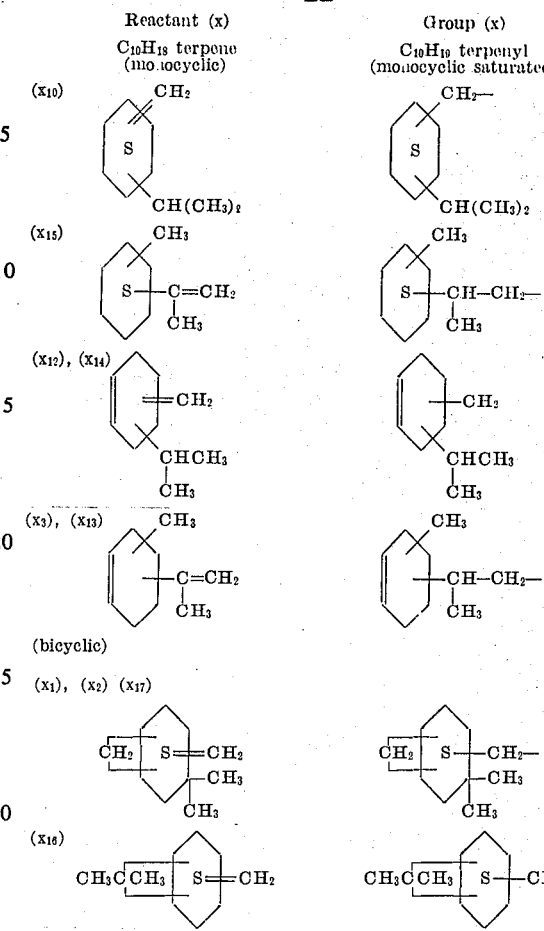

Hence preferred compounds of the invention are alpha-[$C_{10}$ terpenyl]-acyl anhydride of a $C_2$ to $C_5$ carboxylic acid, viz. alpha-[$C_{10}H_{17}$ terpenyl]-acetic anhydride and alpha-[$C_{10}H_{19}$ terpenyl]-acetic anhydride.

The foregoing description herein has been devoted to a substantial extent to the use of relatively higher molecular weight cycloaliphatic olefins ($x_1$) through ($x_{22}$) and ($x_{1a}$) which is mentioned herein immediately after ($x_{22}$). These olefins are quite often relatively expensive compounds as such. As previously indicated herein, perhaps the most significant feature of the instant invention resides in the fact that it is possible to obtain unique and unusual economic advantages by the use of inorganic hydrogen peroxide as the principal if not the only free radical initiator used in the practice of the invention. In so describing this aspect of the invention, however, it has been pointed out that the significant economic advantages accompanying the use of inorganic hydrogen peroxide result in yields which are very good, in fact unusually good in view of what might be expected from the apparently incompatible inorganic hydrogen peroxide used with the organic coreactants ($x$) and ($a$). It has also been pointed out herein that certain aspects of the somewhat better yields that are obtainable using the organic peroxy-type initiators ($b_1$) and ($b_3$) et seq. happen to be obtainable at substantially greater initiator cost, if such organic peroxy compounds are used alone, and in the total absence of the inorganic hydrogen peroxide ($b_2$) initiator. Also, it has been pointed out that it is possible to obtain an exceptional yield advantage by using the inorganic hydrogen peroxide ($b_2$) in combinations with relatively minor molar proportions of the organic peroxy initiators (b) (i.e., such organic compounds being used in very small amounts will be found to involve much less cost for the initiator, as compared to using organic initiators alone, while one appears to be able to obtain a correspondingly greater yield advantage than the use of such relatively minute amounts of the organic initiator would suggest). In the case of certain of the previously mentioned olefins (x), it will be found that at least some of these materials are quite expensive and are sufficiently difficult to handle so that the last-mentioned procedure may afford, at least in some exceptional instances, economic advantages over the use of the inorganic hydrogen peroxide initiator ($b_2$) alone.

On the other hand, it will be appreciated that the practice of the instant invention is not necessarily limited to the use of expensive and/or potentially technologically difficult complex olefins. Instead, the instant invention affords, in perhaps a somewhat different category of advantage, unusual economic advantages in carrying out of the fundamental reaction hereinbefore indicated as Equation (A), using many comparatively inexpensive olefins and/or olefinic-type compounds (x) having the requisite ethylenic unsaturation for alpha-substitution on the acyl group of the acid anhydride (a) reactants, which have been described herein. In such instances, the anhydrides (a) are ordinarily not extremely expensive and/or particularly difficult to handle in the excess amounts required in order to obtain the advantages of the instant invention. Also, many simple olefins such as the generally recognized aliphatic alpha-olefins, and a number of other well known olefinically unsaturated olefins and non-olefins, all of which fall with the generic category of the compounds (x) may be used in the practice of the instant invention with unusual economic advantages, using often the inorganic hydrogen peroxide initiator (b) as the sole free radical promoting initiator (b), for the reason that it was found that the techniques described herein afford very good yields of these compounds and the unreacted or unconverted ethylenically unsaturated reactants (x) are very easily reprocessed and otherwise handled so that the overall economic consideration may often be merely the cost of the peroxy initiator (b) used in the reaction of the instant invention, involving such last-mentioned category of unsaturated compounds. In this respect, attention is directed to the following typical embodiments of the invention as just mentioned. The embodiments are specifically illustrated by Examples 8 through 11.

The foregoing discussion and Examples 8–11 demonstrate rather convincingly that in the case of the relatively simple alpha olefins, particularly 1-dodecene ($x_{30}$), there are distinct advantages in the use of the higher mol proportion of about 0.3 mol $H_2O_2$, plus the higher and/or reflux reaction temperature 135°–140° C., plus slower and more gradual incremental additions of the olefin and peroxide to the refluxing acetic anhydride as well as a longer overall reaction time.

In practicing the invention using the aforesaid alpha olefins, if the boiling point of the olefin (x) is not substantially lower than that of acetic anhydride ($a_1$), which is the lowest boiling reactant (a), the reflux temperature range of substantially 135°–140° C. may be maintained simply during the reaction, at atmospheric pressure; but for lower boiling olefins, a pressure vessel is required (and there is actually no particular reason why certain of the pressure reaction techniques described in the prior art patents using gaseous ethylene, for example, could not be used). It will be appreciated, however, that pressure reaction vessels will have a tendency to afford some operating sophistication, in view of the fact that the gradual addition of the hydrogen peroxide quite apparently affords distinct advantages and such would be required to add the same gradually even in the case of a pressure vessel. On the other hand, continuation of heating the reactants substantially after the addition of the hydrogen peroxide is completed in the practice of the instant invention also affords distinct advantages herein, and this is not complicated in any way by the use of pressure vessels such as the type just mentioned. The removal of the anhydride reactant (a) is again effected ordinarily by simple distillation, but it may also be done by washing with water, which is a procedure that may afford a number of advantages in instances involving more volatile reaction products ($P_{B1}$). The removal of the unreacted olefin is, of course, not a difficult procedure in any case, since it will have a substantially different boiling point from the reaction product in any case. In addition, it will be appreciated that the residual reaction product may be used as such and/or converted by conventional methods to soaps, free acids, methyl, ethyl, butyl, etc., esters, known amides, nitriles, etc., all substantially as described hereinbefore in connection with the conversion of earlier anhydride reaction products, and also as shown in Example 10 hereof.

The embodiments of this invention will be further illustrated by but are not intended to be limited to the following examples. Examples 1–3 hereof illustrate the use of ($x_1$) camphene as the olefin. A commercial grade of camphene is used containing 83 percent actual camphene; the remainder is chiefly tricyclene, a saturated isomer of camphene which is not understood to react with acetic anhydride ($a_1$) under the conditions used.

EXAMPLE 1

A solution of 136 g. commercial ($x_1$) camphene (1.00 mol total, 0.83 mol actual camphene) and 22 g. t-butyl peroxide (0.15 mol) in 390 g. acetic anhydride ($a_1$) is added incrementally over a period of eight hours to 2160 g. acetic anhydride (total of 25 mols or 50 equivalents) maintained at the reflux temperature (138°–39°C.). The reaction mixture is then refluxed for 16 hours longer, then excess acetic anhydride is distilled off at atmospheric pressure until a pot temperature of 150° C. is attained and only 304 g. of material remains. Of this remainder, 300 g. is vacuum-stripped to a pot temperature of 150° C. at 6 mm. Hg pressure, leaving a residual liquid product of 155 g. This product has a saponification number of 338.8, corresponding to 0.95 equivalent of combined acetic anhydride and 0.80 mol of combined camphene, or 96 percent of the actual camphene charged. This product comprises mostly the symmetrical anhydride of 3,3-dimethyl-2-norbornanepropionic acid ($P_1$):

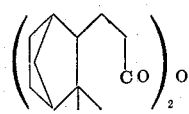

as shown by the acetic anhydride/camphene ratio of 1.19 and by the fact that the product when esterified with ethanol contains 82 percent of the corresponding ethyl ester (calc. S.N., 251; found 252.1, 252.4).

Further runs using camphene and acetic anhydride in the presence of tertiary butyl catalyst are summarized in Table I and IA below.

REACTION OF CAMPHENE WITH ACETIC ANHYDRIDE[1]

TABLE 1

| Run No. | Camphene purity, percent | Mol ratio, $Ac_2O$: camphene | Reaction time, hr. Addn. | Reaction time, hr. Total | Max. stripping temp.,° C. |
|---|---|---|---|---|---|
| A | 90 | 25:1 | 5 | 6 | 144 |
| B | 83 | 25:1 | 5 | 6 | 150 |
| C | 83 | 25:1 | 8 | 24 | 150 |
| D | 83 | 25:1 | 8 | 24 | 150 |
| E | 83 | 25:1 | 8 | 24 | 158 |
| F | 88 | 25:1 | 8 | 24 | 162 |
| a | 83 | 14.4:1 | 8 | 24 | 150 |
| b | 83 | 12.5:1 | 6 | 7 | 100 |
| c | 83 | 12.5:1 | 4 | 7 | 100 |
| d | 83 | 12.5:1 | 8 | 24 | 100 |
| e | 83 | 12.5:1 | 8 | 24 | 101 |
| f | 83 | 12.5:1 | 8 | 24 | 151 |
| G | 83 | 12.5:1 | 8 | 24 | 153 |
| g | 83 | 12.5:1 | 8 | 24 | 160 |
| H | 83 | 12.5:1 | 8 | 24 | 164 |

TABLE 1A

| Run No. | Product S.N.[4] | $Ac_2O$ equiv.[2] | Conversion Camphene mol[2] | Conversion Camphene percent | Percent 1:1 adduct in product[3] |
|---|---|---|---|---|---|
| A | 367.0 | 1.115 | 0.812 | 90 | 85 |
| B | 333.1 | 0.798 | .695 | 84 | 90 |
| C | 338.8 | .949 | .800 | 96 | 82 |
| D | 334.0 | .571 | .491 | 59 | |
| E | 323.4 | .880 | .795 | 96 | 84 |
| F | 324.0 | .943 | .847 | 96 | 85 |
| a | 321.0 | .855 | .778 | 94 | 81 |
| b | 391.8 | .910 | .620 | 75 | 83 |
| c | 393.2 | .940 | .635 | 77 | |
| d | 341.8 | .947 | .790 | 95 | 80 |
| e | 352.6 | .965 | .768 | 93 | |
| f | 317.0 | .825 | .765 | 92 | 82 |
| G | 325.9 | .858 | .765 | 92 | 82 |
| g | 335.5 | .903 | .775 | 93 | 81 |
| H | 325.0 | .855 | .762 | 92 | 83 |

[1] At reflux, using 0.15 mol t-$Bu_2O_2$ per 136 g. commercial camphene, except in D where 0.3 mol of $H_2O_2$ was used.
[2] Per 136 g. of commerical camphene charged.
[3] As determined by esterification.
[4] Saponification number.

EXAMPLE 2

The preparation described in Example 1 is repeated except that twice as much camphene ($x_1$) and t-butyl peroxide are used, keeping the amount of acetic anhydride ($a_1$) the same; reaction temperature is 134°–139° C. and final stripping temperature is 164° C. at 12 mm. Hg. A product is obtained with saponification number of 326.0, corresponding to an acetic anhydride/camphene ratio of 1.12 equivalent per mol and a conversion of 92 percent of actual camphene charged. The butyl esters of the product contain 83 percent of the ester of the 1:1 adduct.

EXAMPLE 3

A solution of 136 g. commercial camphene in 390 g. acetic anhydride is added from one addition-funnel, and 34.2 g. 30 percent hydrogen peroxide (0.3 mol) is added separately but simultaneously from another addition-funnel, incrementally over a period of 8 hours, to 2,160 g. acetic anhydride maintained at the reflux temperature (134°–138° C.). The reaction mixture is then refluxed for 16 hours longer, then the excess acetic anhydride is distilled off at atmospheric pressure until a pot temperature of 150° C. is attained and only 290 g. of material remains. Of this remainder, 288.5 g. is vacuum-stripped to a pot temperature of 150° C. at 7.5 mm. Hg leaving a residual liquid product of 95.5 g. This product has a saponification number of 334.0, corresponding to an acetic anhydride/camphene ratio of 1.16 equivalent/mol and a conversion of 59 percent of actual camphene charged.

EXAMPLE 4

A solution of 22 g. (0.15 mol) t-butyl peroxide ($b_1$) in 136 g. β-pinene ($x_2$) (1 mol) is added over a period of 8 hours to 2,550 g. acetic anhydride (25 mols) maintained at the reflux temperature (137°–139° C.). The reaction mixture is then refluxed for 16 hours longer, then the excess acetic anhydride is distilled off at atmospheric pressure until a pot temperature of 150° C. is attained and 414.5 g. of material remains. Of this remainder, 412 g. is vacuum-stripped to a pot temperature of 152° C. at 12 mm. Hg., leaving a residual liquid product of 174 g. This product has a saponification number of 320.9 corresponding to 1.00 equivalent of combined acetic anhydride and 0.91 mol of combined β-pinene. In this case, a rearrangement takes place in the cyclic olefin ring and the major ingredient of the product is the symmetrical anhydride of 4-isopropyl-cyclohexene-1-propionic acid, ($P_{13}$):

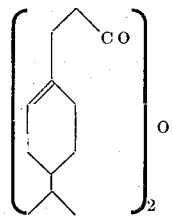

If the foregoing Example 4 is repeated, using as initiator ($b$) only 11 g. of ($b_1$) (0.075 mol), plus 34.2 g. of 30 percent $H_2O_2$ ($b_2$( (0.3 mol), the yield of ($P_{13}$) is only slightly lower; and if this procedure is again repeated using only 2.2 g. of ($b_1$) (0.015 mol), a still lower yield is obtained, in which case such yield is still obtained at a significant economic advantage.

EXAMPLE 5

A solution of 22 g. (0.15 mol) t-butyl peroxide ($b_1$) in 136 g. d-limonene ($x_3$) (1 mol) is added over a period of five hours to 2,550 g. acetic anhydride ($a_1$) maintained at the reflux temperature (136.5°–138.5° C.). The reaction mixture is refluxed for 1 hour longer and then worked up as in the previous examples. The final stripping temperature is 110° C. at 12 mm. Hg. A liquid product ($P_{15}$) is obtained with saponification number 302.4, corresponding to 0.54 equivalent of combined acetic anhydride and 0.53 mol of combined limonene.

If the ($b_1$):($b_2$) peroxide combinations are used (according to the second paragraph of Example 4) in procedures, otherwise repeating the foregoing Example 5 comparable results are obtained.

EXAMPLE 6

A solution of 22 g. (0.15 mol) t-butyl peroxide ($b_1$) in 108 g. 4-vinyl-1-cyclohexene ($x_4$) (1 mol) is added over a period of 8 hours to 2,550 g. acetic anhydride ($a_1$) maintained at the reflux temperature (134°–139° C.). The reaction mixture is refluxed for 16 hours longer and then worked up as in the previous examples. The final stripping temperature is 135° C. at 10 mm. Hg. A liquid product ($P_{16}$) is obtained with saponification number 335.4, corresponding to 0.45 equivalent of combined acetic anhydride and 0.48 mol of combined vinylcyclohexene.

Again, if the ($b_1$):($b_2$) peroxide combinations in the relative molar proportions previously specified (according to the procedures of the second paragraph of Example 4 hereof) are used in the procedure of the above paragraph of this Example, substantially the same results are obtained.

EXAMPLE 7

A solution of 22 g. (0.15 mol) t-butyl peroxide ($b_1$) and 54 g. 1,2,4-trivinylcyclohexane ($x_5$) (0.33 mol) in 102 g. acetic anhydride ($a_1$) is added over a period of 8 hours to 2,448 g. acetic anhydride (total 25 mols) maintained at reflux (137°–139° C.). The reaction mixture is then refluxed for 16 hours longer and then worked up as in the previous examples. The final stripping temperature is 92° C. at 13 mm. Hg. A crumbley rubbery solid product ($P_{17}$) is obtained with saponification number 497.4, corresponding to 0.90 equivalent of combined acetic anhydride and 0.34 mol of combined trivinylcyclohexane (i.e., approximately 1.02 equivalent).

Again, if the ($b_1$):($b_2$) peroxide combinations in the relative molar proportions previously specified (according to the procedures of the second paragraph of Example 4 hereof) are used in the procedure of the above paragraph of this Example, substantially the same results are obtained.

EXAMPLE 8

To 2,550 g. (25 mols or 50 equivalents) of acetic anhydride ($a_1$) there is added, incrementally over a period of 5 hours, 168 g. (1 mol) of 1-dodecene ($x_{30}$) and 34.2 g. (0.3 mol) of 30 percent hydrogen peroxide from separate addition funnels. The reaction mixture ($b_2$) is maintained at the reflux temperature during this time and for 1 hour thereafter. Most of the excess acetic anhydride ($a_1$) is then distilled from the reaction mixture at atmospheric pressure. Of the remaining 287.5 g. of reaction mixture, 282.0 g. is stripped under vacuum (to a pot temperature of 149° C. at 0.1 mm.) to remove the rest of the acetic anhydride ($a_1$) and any unreacted dodecene ($x_{30}$). The final stripped product ($P_{50}$) amounted to 205.0 g. and solidified to a crystalline solid on cooling to room temperature. This product has a saponification number of 251.8, which corresponds to a utilization of 0.960 mol of dodecene and 0.936 equivalent of acetic anhydride ($a_1$) per mol of dodecene ($x_{30}$) charged. Analysis of this product by gas-liquid chromatography indicates a myristic anhydride ($P_{A1}$) content of about 64 percent.

EXAMPLE 9

To 2,550 g. (25 mols) of acetic anhydride ($a_1$) there is added, incrementally over a period of five hours, 168 g. (1 mol) of 1-dodecene ($x_{30}$) and 34.2 g. (0.3 mol) of 30 percent hydrogen peroxide ($b_2$) from separate addition funnels. The reaction mixture is maintained at the reflux temperature during this time and for 1 hour thereafter. Most of the excess acetic anhydride is then distilled from the reaction mixture at atmospheric pressure, then the pressure is reduced to 10 mm. of mercury and distillation is continued until only 218.0 G. remain in the reaction flask. This remainder is then saponified by adding 1,600 g. of 5 percent sodium hydroxide solution and stirring at 95°–99° C. until a clear solution is obtained (1 hour). The clear soap solution is then diluted with 4,400 g. of warm water and allowed to cool to room temperature. The slurry of precipitated sodium salts is then acidified with a solution of 220 g. of concentrated hydrochloric acid in 660 g. of water and the resulting product is filtered off, washed with water, and dried in a vacuum oven at 35°–40 C. The dried product amounts to 215.5 g. and has an acid number of 218.2. According to gas-liquid chromatographic analysis, the product contains about 66 percent myristic acid ($P_{B1}$).

EXAMPLE 10

A 100.0 g. sample of the crude myristic anhydride ($P_{A1}$) prepared in Example 8 is refluxed with 400 g. of anhydrous methanol and 4.0 g. of concentrated sulfuric acid for 2 hours. About three-fourths of the methanol is then distilled off and the remainder of the methanol is washed out with water. The remaining product is washed with 5 percent sodium carbonate solution, dried over magnesium sulfate, and then vacuum distilled. From 100.0 g. of dried product there is obtained 67.0 g. of a water-white fraction, boiling mostly at 96°–99° C. at 0.3 mm., which has a saponification number of 231.8 (calculated value for methyl myristate is 232).

EXAMPLE 11

The variations in the process of Example 8 are evaluated by making comparisons of procedures related thereto using 1-dodecene as the olefin ($x$). The procedures and results so obtained are tabulated in Table 2 (below):

TABLE 2.—EFFECT OF REACTION CONDITIONS *

| Run No. | $H_2O_2$ (mol) | Temp. (° C.) | Rx. time (hrs.) addition of— | | Equivalents in product | |
|---|---|---|---|---|---|---|
| | | | $H_2O_2$ | Total | Olefin | $Ac_2O$ |
| D1 | 0.15 | 75–80 | 5 | 6 | 0.520 | 0.307 |
| E1 | .15 | 135–140 | 5 | 7 | .700 | .584 |
| A1 | .3 | 135–140 | 5 | 6 | .960 | .936 |
| F1 | .3 | 135–140 | 8 | 24 | .980 | .991 |

* N.B.—Conditions other than stated in the table are the same as given in Example 8.

It will be appreciated that the foregoing Examples 8 through 11, and particularly the comparative results shown on Table 2 above, suggest preferred techniques and/or operating conditions for the use of hydrogen peroxide as the free radical promoting initiator ($b_2$), which is used alone in this particular group of examples for the purpose of demonstrating preferred operating procedures for the use thereof. On Table 2, Runs D1 and E1 suggest that the lower mol proportion of 0.15 mol, plus the lower operating temperature of 75°–80° C. and a relatively short addition time will result in a product ($P_{D1}$) wherein the equivalents of the olefin, 1-dodecene ($x_{30}$) for each equivalent of acetic anhydride ($a_1$) are almost two to one, which might be desirable for some purposes in connection with the telomer type of formation, but which is not specifically preferred as a result in the practice of the instant invention. Instead, the results on Table 2 tend to point out substantially how one may obtain very good yields with the alpha olefin 1-dodecene ($x_{30}$) using hydrogen peroxide ($b_2$) in the procedure of the invention. It is thus apparent that Run E1 of Table 2 shows that a preferred result, over that of Run D1, is obtained by increasing the operating temperature to 135°–140° C. (i.e., the reflux temperature of the acetic anhydride used), plus the use of a slightly longer reaction time. It will be seen that the product ($P_{E1}$) obtained in Run E1 of Table 2 much more closely approaches the preferred 1:1 (equivalent ratio) adduct which is desired in the practice of the invention. It will further be noted that, at least in the case of the alpha olefin 1-dodecene ($x_{30}$), the higher molar proportion of 0.3 mol $H_2O_2$, plus the use of reflux temperatures for the excess acetic anhydride reaction mix definitely is to be preferred for purposes of obtaining the product ($P_{A1}$) and ( $P_{F1}$ ), with the latter indicating a superior overall yield and a better yield of 1:1 adduct, apparently as a result of the much slower rate of incremental addition of the reactants (i.e., 8 hours as compared to 5 hours, plus a total overall reaction time of 24 hours as compared to only 6 hours for Run A1).

Other more specific examples showing variations in ( $x$ ) and ( $a$ ) include the following:

EXAMPLE 12

To 2,550 g. (25 mols) of acetic anhydride ( $a_1$ ) are added, over a period of 5 hours, 184 g. ( 1 mol) of 10-undecenoic acid ($x_{30a}$) and 34.2 g. (0.3 mol) of 30 percent hydrogen peroxide ($b_2$) from separate addition funnels, while maintaining the reaction mixture at the reflux temperature. After additional refluxing for 2 hours, the excess acetic anhydride is distilled off, first at atmospheric pressure, then at 18 mm. (to a pot temperature of 153° C.). The semi-gelatinous product (233 g.), comprising poly(brassylic anhydride), is esterified with methanol to give 17 g. of methyl 10-undecenoate and 104 g. of dimethyl brassylate.

To 2,550 g. (25 mols) of acetic anhydride ($a_1$) is added, over a period of 8 hours, a solution of 184 g. (1 mol) of 10-undecenoic acid ($x_{30a}$) and 22 g. ( 0.15 mol) of di-t-butyl peroxide ($b_1$), while maintaining the reaction mixture at the reflux temperature (137°-9° C.). After 16 hours of additional refluxing (135°-7° C.), the reaction-mixture is worked up as described in Example 12. The semi-gelatinous anhydride product amounted to 247 g., which is esterified to give 6 g. of methyl 10-undecenoate and 114 g. of dimethyl brassylate.

It will be seen that the initial anhydride product in this Example 12 is actually a polymeric anhydride, formed according to the equation sequence (N) below:

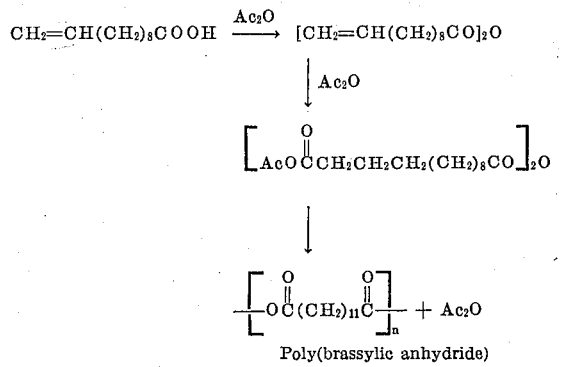

Poly(brassylic anhydride)

Using either hydrogen peroxide ($b_2$) or t-butyl peroxide ($b_1$), essentially the same polyanhydride was obtained which was readily converted to the monomeric dimethyl brassylate.

The somewhat better yield obtained using the organic peroxide ($b_1$) is not insignificant from the point of view of yield alone; but the fact that the much less expensive and more readily available $H_2O_2$ ($b_2$) gives an excellent yield results in unusual economic advantages in the practice of the invention. Also, the use of an acid as the unsaturated reactant ($x$) is demonstrated, but using the anhydrous co-reactant ($a_1$) in excess, as stated hereinbefore.

With respect to the foregoing comparison between organic ($b_1$) and "inorganic" $H_2O_2$ ($b_2$), comparative yields for given reactants ($a$) and ($x$) under given conditions do often show better yields as such at least for preferred organic promoters, such as tert.-butyl peroxide ($b_1$) but the extreme savings in cost of materials using $H_2O_2$ ($b_2$) much more than compensates for this.

EXAMPLE 13

The procedure of Example 8 is repeated using as ($x$) the various alpha-olefins and blends thereof recited on Table 3A and 3B below, and comparing 30% $H_2O_2$ ($b_2$) with tert.-butyl peroxide ( $b_1$ ), in various proportions and for somewhat different reaction times. Unless specified in Tables 3A-B below the conditions proportions and ingredients used in each run are those recited in previous Example 8.

TABLE 3A
a-Olefins plus acetic anhydride
(1:25 mol ratio, at reflux temperature)

| Olefin used | Initiator | | Reaction time, hrs. | |
|---|---|---|---|---|
| | Type | Mols | Addn. | Total |
| 1-dodecene | $H_2O_2$ | 0.3 | 5 | 7 |
| Do | t-Bu$_2$O$_2$ | .15 | 5 | 6 |
| Do | t-Bu$_2$O$_2$ | .075 | 5 | 7 |
| Do | t-Bu$_2$O$_2$ | .04 | 5 | 7 |
| Do | t-Bu$_2$O$_2$ | .04 | 8 | 24 |
| C$_6$-C$_7$ a-olefin blend | $H_2O_2$ | .3 | 5 | 6 |
| C$_6$-C$_{10}$ a-olefin blend | $H_2O_2$ | .3 | 5 | 6 |
| C$_9$-C$_{10}$ a-olefin blend | $H_2O_2$ | .3 | 5 | 7 |
| Do | $H_2O_2$ | .3 | 7 | 9 |
| Do | t-Bu$_2$O$_2$ | .3 | 5 | 7 |
| C$_{11}$-C$_{15}$ a-olefin blend | $H_2O_2$ | .3 | 5 | 7 |
| C$_{16}$-C$_{17}$ a-olefin blend | $H_2O_2$ | .3 | 5 | 6 |
| 1-octadecene | $H_2O_2$ | .3 | 5 | 6 |

TABLE 3B

| Olefin used | Equivalents combined in product | | Wt. percent 1:1 adduct in product |
|---|---|---|---|
| | Olefin | Ac$_2$O | |
| 1-dodecene | 0.97 | 1.16 | 70 |
| Do | .99 | 0.94 | |
| Do | .97 | .88 | |
| Do | .68 | .50 | |
| Do | .87 | .73 | |
| C$_6$-C$_7$ a-olefin blend | .81 | .55 | |
| C$_6$-C$_{10}$ a-olefin blend | .87 | .77 | |
| C$_9$-C$_{10}$ a-olefin blend | .90 | 1.09 | 71 |
| Do | .91 | 1.03 | |
| Do | .99 | | 68 |
| C$_{11}$-C$_{15}$ a-olefin blend | .97 | 1.11 | 68 |
| C$_{16}$-C$_{17}$ a-olefin blend | .98 | 1.12 | 74 |
| 1-octadecene | 1.00 | 0.92 | 65 |

Examples 14 and 15, below, provide a specific comparison between acetic ($a$) and the next higher propionic ($a_2$) and butyric ($a_3$) anhydride showing a distinct difference; but also showing unusually good results using such higher anhydride ($a_2$) and ($a_3$). Also, these Examples 14 and 15 show that the preferred organic promoter ($a_1$) obtains correspondingly lower yields which again demonstrates how the economics of the invention can be judged or predicted quite intelligently based essentially upon the comparisons demonstrated herein relative to the use of $H_2O_2$; plus whatever knowledge the skilled worker may acquire from this specification (or otherwise) with respect to the use of tert.-butyl peroxide ($b_1$).

EXAMPLE 14

To 2,925 g. (22.5 mols) of propionic anhydride are added over a period of 5 hours, 151 g. (0.9 mol) of 1-dodecene and 30.6 g. (0.27 mol) of 30 percent hydrogen peroxide from separate addition funnels. A reaction temperature of 138°–140° C. is maintained during the addition and, for 1 hour thereafter. Most of the excess propionic anhydride is removed by vacuum distillation, leaving 171 g. of product with a saponification number of 281.6, corresponding to 0.76 mol of dodecene and 0.95 equivalent of propionic anhydride per mol of dodecene charged. This product is mostly a-methylmyristic anhydride, as shown by esterifying the product with methanol to give a mixture of esters containing 82 percent methyl a-methylmyristate.

EXAMPLE 15

To 2,760 g. (17.5 mols) of isobutyric anhydride are added, over a period of five hours, 117.6 g. (0.7 mol) of 1-dodecene and 23.7 g. (0.21 mol) of 30% $H_2O_2$ from separate addition funnels. A reaction temperature of 150°–151° C. is maintained during the addition and for one hour thereafter. The reaction mixture is worked up as in Example 14, giving 33.7 g. of anhydride product corresponding to 0.16 mol of dodecene and 0.28 equivalent of isobutyric anhydride per mol of dodecene charged. When the reaction is repeated using 15.4 g. (0.15 mol) of t-$Bu_2O_2$ dissolved in the dodecene, instead of the $H_2O_2$ added separately, and a reaction temperature of 151°–158° C., the anhydride product amounts to 53.4 g. and corresponds to 0.28 mol of dodecene and 0.38 equivalent of isobutyric anhydride per mol of dodecene charged; the methyl esters made from this product contain approximately 75 percent methyl, a,a-dimethylmyristate.

In spite of certain correlations between ($b_1$) and ($b_2$) which have been explained herein, it must be appreciated that such correlations apply only to the extent taught herein. Thus prior art workers may and do suggest the use of certain agents to promote various reactions between olefinically unsaturated compounds such as (x) hereof and various general classes of compounds containing an acyl group (with or without an available alpha-hydrogen). It must be appreciated that such latter "acyl" compounds, if outside the scope here disclosed and claimed are essentially non-functional with $H_2O_2$ ($b_2$), even though they may function with ($b_1$). Examples 16, 17 and 18 show such comparisons below:

EXAMPLE 16

To 885 g. (15 mols) of acetamide is added, over a period of 5 hours, a solution of 50.4 g. (0.3 mol) of 1-dodecene and 6.6 g. (0.045 mol) of t-$Bu_2O_2$. A reaction temperature of 137°–139° C. is maintained during the addition and for 1 hour thereafter. The reaction mixture is then cooled to about 85° C. and the excess acetamide removed by washing with water. There is obtained 48 g. of a solid product containing 4.12 percent nitrogen, corresponding to 0.78 mol of dodecene and 0.48 mol of acetamide per mol of dodecene charged. When the reaction is repeated using 10.2 g. (0.09) of 30% $H_2O_2$ (added separately) instead of t-$Bu_2O_2$, a liquid product (146.7 g.) containing only 0.035 percent nitrogen is obtained, corresponding to only 0.0037 mol of acetamide per mol of dodecene charged.

EXAMPLE 17

To 2,700 g. (45 mols) of glacial acetic acid is added over a period of five hours, a solution of 168 g. (1 mol) of 1-dodecene and 22 g. (0.15 mol) of t-$Bu_2O_2$ in 300 g. (5 mols) of acetic acid. The reaction mixture is maintained at reflux (117° C.) during the addition and for 2 hours thereafter. Most of the acetic acid is then distilled off at atmospheric pressure and the remainder is washed out with water. The residual product, after drying, amounts to 111 g. and has an acid number of 75.9 and a saponification number of 82.8, corresponding to 0.60 mol of combined dodecene, 0.15 equivalent of acid, and 0.012 equivalent of ester per mol of dodecene charged. When the experiment is repeated using an 8-hour addition period and a 16-hour subsequent reflux, 180 g. of product is obtained with acid number 145.8 and saponification number 160.6, corresponding to 0.89 mol of combined dodecene, 0.47 equivalent of acid, and 0.048 equivalent of ester.

EXAMPLE 18

To 3,000 g. (50 mols) of glacial acetic acid are added, over a period of 5 hours, 168 g. (1 mol) of 1-dodecene and 134.2 g. (0.3 mol) of 30% $H_2O_2$, from separate addition funnels. The reaction mixture is held at the reflux temperature during the addition and for 2 hours thereafter, and is then worked up as in Example 17. The residual product amounts to 121 g. and has an acid number of 5.9, a saponification number of 227.6, and a hydroxyl number of 54.0; corresponding to 0.54 mol of combined dodecene, 0.013 equivalent of acid, and 0.48 equivalent of ester. Dilution of the recovered acetic acid distillate with water liberates 70 g. (0.42 mol) of unreacted dodecene.

The embodiments of the invention in which an exclusive property or privilege is claimed are defined as follows:

1. 3,3-dimethyl-2-norbornane propionic acid.

* * * * *